US010999075B2

(12) United States Patent  
Cai et al.

(10) Patent No.: US 10,999,075 B2  
(45) Date of Patent: May 4, 2021

(54) BLOCKCHAIN-BASED PATROL INSPECTION PROOF STORAGE METHOD, APPARATUS, AND ELECTRONIC DEVICE

(71) Applicant: ADVANCED NEW TECHNOLOGIES CO., LTD., Grand Cayman (KY)

(72) Inventors: Hongbo Cai, Hangzhou (CN); Kaiming Huang, Hangzhou (CN); Zhe Han, Hangzhou (CN); Shiqi Jiang, Hangzhou (CN); Lei Yang, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 16/886,657

(22) Filed: May 28, 2020

(65) Prior Publication Data

US 2020/0322153 A1 Oct. 8, 2020

Related U.S. Application Data

(63) Continuation of application No. PCT/CN2020/071563, filed on Jan. 11, 2020.

(30) Foreign Application Priority Data

Jun. 17, 2019 (CN) .......................... 201910521227.3

(51) Int. Cl.
*H04L 9/32* (2006.01)
*H04W 12/00* (2021.01)
(Continued)

(52) U.S. Cl.
CPC .......... *H04L 9/3218* (2013.01); *G06F 21/602* (2013.01); *G07C 1/20* (2013.01);
(Continued)

(58) Field of Classification Search
CPC . H04L 9/3218; H04L 9/3247; H04L 2209/38; H04W 12/00503; H04W 12/1004; G06F 21/602; G07C 1/20
(Continued)

(56) References Cited

U.S. PATENT DOCUMENTS

| 5,339,339 | A  | * | 8/1994  | Petitclerc | G06F 3/0227 |
|           |    |   |         |            | 376/245     |
| 8,559,914 | B2 | * | 10/2013 | Jones      | H04M 11/04  |
|           |    |   |         |            | 455/404.2   |

(Continued)

FOREIGN PATENT DOCUMENTS

| CN | 104299286 A | 1/2015 |
| CN | 105976448 A | 9/2016 |

(Continued)

OTHER PUBLICATIONS

Albert T. Yeung, A mobile biometric authentication system for site management in Hong Kong, Article in Management Procurement and Law • Sep. 2017 (Year: 2007).*

(Continued)

*Primary Examiner* — Noura Zoubair
*Assistant Examiner* — Mahabub S Ahmed

(57) ABSTRACT

Methods, systems, and apparatus, including computer programs encoded on computer storage media, for blockchain-based storage of patrol inspection proof are provided. One of the methods includes: receiving proof information of patrol inspection at a patrol inspection site; obtaining one or more operating environment parameters of the mobile terminal at a time of the patrol inspection, wherein the one or more operating environment parameters comprise at least location information and sensor data of the mobile terminal; performing credibility verification on the patrol inspection site based on the proof information, the location information, and the sensor data using an algorithm model based on (Continued)

labeled identification information, labeled operating environment parameters, and historical attendance information; and in response to the credibility verification being successful, uploading verification information associated with the proof information for storing in a blockchain.

20 Claims, 5 Drawing Sheets

(51) Int. Cl.
 *G06F 21/60* (2013.01)
 *G07C 1/20* (2006.01)
 *H04W 12/10* (2021.01)
(52) U.S. Cl.
 CPC ..... *H04L 9/3247* (2013.01); *H04W 12/00503* (2019.01); *H04W 12/1004* (2019.01); *H04L 2209/38* (2013.01)
(58) Field of Classification Search
 USPC .......................................................... 713/193
 See application file for complete search history.

(56) References Cited

U.S. PATENT DOCUMENTS

| | | | |
|---|---|---|---|
| 8,977,230 B2 | 3/2015 | Jones et al. | |
| 9,069,356 B2* | 6/2015 | Papaefstathiou | G08B 13/19682 |
| 9,386,281 B2* | 7/2016 | Trundle | G08B 13/19695 |
| 9,392,099 B2* | 7/2016 | Lim | H04M 1/72538 |
| 9,432,632 B2 | 8/2016 | Cheng et al. | |
| 9,589,439 B2 | 3/2017 | Golden | |
| 9,593,843 B2 | 3/2017 | McRory | |
| 9,629,220 B2 | 4/2017 | Panopoulos et al. | |
| 9,684,962 B2 | 6/2017 | Zhou et al. | |
| 9,696,409 B2 | 7/2017 | Fox et al. | |
| 9,779,183 B2 | 10/2017 | Gallo et al. | |
| 9,843,777 B2 | 12/2017 | Schofield et al. | |
| 9,894,158 B2 | 2/2018 | Ranasinghe et al. | |
| 9,894,885 B2 | 2/2018 | Schab et al. | |
| 10,360,668 B1* | 7/2019 | McGregor | G06K 9/6202 |
| 10,467,885 B2* | 11/2019 | Trundle | G05D 1/0011 |
| 10,600,295 B2* | 3/2020 | Kempel | G08B 13/19608 |
| 2005/0023347 A1* | 2/2005 | Wetzel | G07C 1/20 235/385 |
| 2005/0211777 A1* | 9/2005 | Wetzel | G07C 3/14 235/385 |
| 2006/0074592 A1* | 4/2006 | Dobell | G07C 1/20 702/182 |
| 2014/0049653 A1* | 2/2014 | Leonard | H04N 5/44 348/207.1 |
| 2014/0151446 A1* | 6/2014 | Bovell | G06Q 10/087 235/375 |
| 2015/0310566 A1* | 10/2015 | Smyth | G06Q 10/1091 705/32 |
| 2016/0232277 A1* | 8/2016 | Zmijewski | G06F 30/17 |
| 2016/0314546 A1* | 10/2016 | Malnati | G06Q 50/163 |
| 2017/0024988 A1 | 1/2017 | Benson et al. | |
| 2017/0031369 A1 | 2/2017 | Liu et al. | |
| 2017/0091397 A1* | 3/2017 | Shah | G06Q 50/01 |
| 2018/0005465 A1* | 1/2018 | Truong | G07C 9/00571 |
| 2018/0182179 A1* | 6/2018 | Teh | G07C 1/20 |
| 2018/0329405 A1* | 11/2018 | Liu | G07C 1/20 |
| 2018/0336286 A1* | 11/2018 | Shah | G06Q 10/10 |
| 2019/0042867 A1* | 2/2019 | Chen | G06K 9/46 |
| 2019/0130086 A1* | 5/2019 | Tovey | H04L 9/3247 |
| 2019/0208294 A1* | 7/2019 | Stamatakis | G01D 4/006 |
| 2019/0287200 A1* | 9/2019 | Schuler | G06Q 50/265 |
| 2019/0303670 A1* | 10/2019 | Bryden | H04L 9/0643 |
| 2019/0357049 A1* | 11/2019 | Tali | G06F 21/36 |
| 2020/0012634 A1* | 1/2020 | Eberhardt | G06F 16/2365 |
| 2020/0034888 A1* | 1/2020 | Soundararajan | H04N 7/181 |
| 2020/0034945 A1* | 1/2020 | Soundararajan | H04L 9/3247 |
| 2020/0099531 A1* | 3/2020 | Chidambaram | G06Q 10/0633 |
| 2020/0127812 A1* | 4/2020 | Schuler | H04L 63/0428 |
| 2020/0247359 A1* | 8/2020 | Murray | G08B 25/009 |
| 2020/0302562 A1* | 9/2020 | Trim | G06Q 50/163 |
| 2020/0320173 A1* | 10/2020 | Procaccioli | G06F 30/18 |
| 2020/0329018 A1* | 10/2020 | Tali | H04L 9/32 |

FOREIGN PATENT DOCUMENTS

| | | | | |
|---|---|---|---|---|
| CN | 106097470 A | * | 11/2016 | ............ G07C 1/20 |
| CN | 106097470 A | | 11/2016 | |
| CN | 206058312 U | | 3/2017 | |
| CN | 107491891 A | | 12/2017 | |
| CN | 107767478 A | | 3/2018 | |
| CN | 108574734 A | | 9/2018 | |
| CN | 109446830 A | * | 3/2019 | ............ G06F 21/60 |
| CN | 109446830 A | | 3/2019 | |
| CN | 208581224 U | | 3/2019 | |
| CN | 109615724 A | | 4/2019 | |
| CN | 109726922 A | | 5/2019 | |
| CN | 109859088 A | | 6/2019 | |
| CN | 110337104 A | | 10/2019 | |
| KR | 20190023274 A | | 3/2019 | |

OTHER PUBLICATIONS

First Search dated May 18, 2020, issued in related Chinese Application No. 201910521227.3 (3 pages).
First Office Action dated May 28, 2020, issued in related Chinese Application No. 201910521227.3, with English machine translation (26 pages).
Second Office Action dated Jun. 29, 2020, issued in related Chinese Application No. 201910521227.3, with English machine translation (27 pages).
Written Opinion and International Search Report for PCT Application No. PCT/CN2020/071563 made available to public on Dec. 24, 2020.

* cited by examiner

BLOCKCHAIN-BASED PATROL INSPECTION PROOF STORAGE METHOD, APPARATUS, AND ELECTRONIC DEVICE

CROSS-REFERENCE TO RELATED APPLICATION

This application is a continuation application of International Patent Application No. PCT/CN2020/071563, filed with the China National Intellectual Property Administration (CNIPA) on Jan. 11, 2020, which is based on and claims priority to and benefit of Chinese Patent Application No. 201910521227.3, filed with the CNIPA on Jun. 17, 2019. The entire contents of all of the above-identified applications are incorporated herein by reference.

TECHNICAL FIELD

The specification relates to the field of computer technologies, and in particular, to a blockchain-based patrol inspection proof storage method, an apparatus, an electronic device, and a computer readable storage medium.

BACKGROUND

In a large number of offline sites such as shopping malls, office buildings, schools, factories, hotels, or residential buildings, patrol tasks for fire protection, safety, and the like need to be regularly and consistently conducted. Currently, patrol inspections are mainly performed by manpower. Specifically, a person on duty goes to a specified patrol inspection site at a specified time or at a specified frequency, to inspect and confirm a safety status of the site. Most patrol inspections are performed by manpower and have no supervision mechanism and no data record, leading to high costs or difficulty in cause confirmation and liability retroaction afterwards.

SUMMARY

Embodiments of the specification provide a blockchain-based patrol inspection proof storage method, an apparatus, an electronic device, and a computer readable storage medium, so that a traceable and tamperproof information record can be conveniently implemented.

To resolve the foregoing technical problems in the prior art, the embodiments of the specification are implemented as follows.

An embodiment of the specification provides a blockchain-based patrol inspection proof storage method, including: collecting patrol inspection proof information of a patrol inspection site using a mobile terminal; obtaining operating environment parameters when the mobile terminal collects the patrol inspection proof information, wherein the operating environment parameters include at least location-related information and sensor data of the mobile terminal; and uploading irreversible verification information of patrol inspection proof storage information to a proof storage blockchain, wherein the proof storage blockchain is configured to verify that data stored in the proof storage blockchain is trusted, and the patrol inspection proof storage information includes the patrol inspection proof information and includes the location-related information and/or the sensor data.

An embodiment of the specification further provides a blockchain-based patrol inspection proof storage method, including: collecting patrol inspection proof information of a patrol inspection site using a mobile terminal; obtaining operating environment parameters when the mobile terminal collects the patrol inspection proof information, wherein the operating environment parameters include at least location-related information and sensor data of the mobile terminal; performing credibility verification on the patrol inspection site based on the location-related information and the sensor data; and when the credibility verification succeeds, uploading irreversible verification information of patrol inspection proof storage information to a proof storage blockchain, wherein the proof storage blockchain is configured to verify that data stored in the proof storage blockchain is trusted, and the patrol inspection proof storage information includes at least the patrol inspection proof information.

An embodiment of the specification further provides a patrol inspection verification method, including: receiving a filtering condition input by an inspection person, wherein the filtering condition is used to filter patrol inspection proof storage information of a specified patrol inspection person at a specified patrol inspection site; querying, according to the filtering condition, for the patrol inspection proof storage information corresponding to the specified patrol inspection person and the specified patrol inspection site; and performing credibility verification on the patrol inspection proof storage information based on irreversible verification information that corresponds to the specified patrol inspection person and the specified patrol inspection site and that is stored in a proof storage blockchain.

An embodiment of the specification further provides a blockchain-based patrol inspection proof storage apparatus, including: a proof information collection module, configured to collect patrol inspection proof information of a patrol inspection site; an environment parameter collection module, configured to obtain operating environment parameters when the patrol inspection proof information is collected, wherein the operating environment parameters include at least location-related information and sensor data of the mobile terminal; and an information storage module, configured to upload irreversible verification information of patrol inspection proof storage information to a proof storage blockchain, wherein the proof storage blockchain is configured to verify that data stored in the proof storage blockchain is trusted, and the patrol inspection proof storage information includes the patrol inspection proof information and includes the location-related information and/or the sensor data.

An embodiment of the specification further provides a blockchain-based patrol inspection proof storage apparatus, including: a proof information collection module, configured to collect patrol inspection proof information of a patrol inspection site; an environment parameter collection module, configured to obtain operating environment parameters when the patrol inspection proof information is collected, wherein the operating environment parameters include at least location-related information and sensor data of the mobile terminal; a credibility verification module, configured to perform credibility verification on the patrol inspection site based on the location-related information and the sensor data; and a proof information storage module, configured to: when the credibility verification succeeds, upload irreversible verification information of patrol inspection proof storage information to a proof storage blockchain, wherein the proof storage blockchain is configured to verify that data stored in the proof storage blockchain is trusted, and the patrol inspection proof storage information includes at least the patrol inspection proof information.

An embodiment of the specification further provides a patrol inspection verification apparatus, including: a condition receiving module, configured to receive a filtering condition input by an inspection person, wherein the filtering condition is used to filter patrol inspection proof storage information of a specified patrol inspection person at a specified patrol inspection site; a file querying module, configured to query, according to the filtering condition, for the patrol inspection proof storage information corresponding to the specified patrol inspection person and the specified patrol inspection site; and a file verification module, configured to perform credibility verification on the patrol inspection proof storage information based on irreversible verification information that corresponds to the specified patrol inspection person and the specified patrol inspection site and that is stored in a proof storage blockchain.

An embodiment of the specification further provides a computer device, including: a memory, a processor, and computer-executable instructions that are stored in the memory and that are executable on the processor, wherein when the computer-executable instructions are executed by the processor, the following operations are performed: collecting patrol inspection proof information of a patrol inspection site using a mobile terminal; obtaining operating environment parameters when the mobile terminal collects the patrol inspection proof information, wherein the operating environment parameters include at least location-related information and sensor data of the mobile terminal; and uploading irreversible verification information of patrol inspection proof storage information to a proof storage blockchain, wherein the proof storage blockchain is configured to verify that data stored in the proof storage blockchain is trusted, and the patrol inspection proof storage information includes the patrol inspection proof information and includes the location-related information and/or the sensor data.

An embodiment of the specification further provides a computer-readable storage medium, wherein the computer-readable storage medium is configured to store a computer-executable instruction, and when the computer-executable instructions are executed by a processor, the following operations are performed: collecting patrol inspection proof information of a patrol inspection site using a mobile terminal; obtaining operating environment parameters when the mobile terminal collects the patrol inspection proof information, wherein the operating environment parameters include at least location-related information and sensor data of the mobile terminal; and uploading irreversible verification information of patrol inspection proof storage information to a proof storage blockchain, wherein the proof storage blockchain is configured to verify that data stored in the proof storage blockchain is trusted, and the patrol inspection proof storage information includes the patrol inspection proof information and includes the location-related information and/or the sensor data.

In one aspect, a method for blockchain-based storage of patrol inspection proof is provided. The method includes: receiving proof information of patrol inspection at a patrol inspection site; obtaining one or more operating environment parameters of the mobile terminal at a time of the patrol inspection, wherein the one or more operating environment parameters comprise at least location information and sensor data of the mobile terminal; performing credibility verification on the patrol inspection site based on the proof information, the location information, and the sensor data using an algorithm model based on labeled identification information, labeled operating environment parameters, and historical attendance information; and in response to the credibility verification being successful, uploading verification information associated with the proof information for storing in a blockchain.

In an embodiment, the method further comprises: receiving, from a client terminal, one or more filtering conditions associated with the patrol inspection site; querying to identify the proof information of the patrol inspection at the patrol inspection site; verifying the identified proof information based on the verification information stored in the blockchain; returning, to the client terminal, a verification result indicating that the identified proof information is verified.

In an embodiment, the proof information comprises biometric recognition information of a patrol inspection person conducting the patrol inspection.

In an embodiment, the location information comprises: global positioning system (GPS) positioning information of the mobile terminal; base station information within a first preset distance from the mobile terminal; wireless fidelity (Wi-Fi) information within a second preset distance from the mobile terminal; Bluetooth information within a third preset distance from the mobile terminal; or hotspot information within a fourth preset distance from the mobile terminal.

In an embodiment, the sensor data comprises: temperature information, humidity information, atmospheric pressure information, or sensor data of at least one axis of a multi-axis sensor.

In an embodiment, the one or more operating environment parameters further comprise: a focal length of a camera.

In an embodiment, the proof information comprises: a visual file of a marker of the patrol inspection site captured using the mobile terminal.

In an embodiment, the proof information comprises: information obtained by scanning a barcode of the patrol inspection site using the mobile terminal.

In an embodiment, the proof information comprises: information in a signal received by an NFC module of the mobile terminal from an NFC device at the patrol inspection site.

In an embodiment, the verification information comprises: a digest of the proof information and the one or more operating environment parameters; or a digital signature on the digest based on a private key of a patrol inspection person conducting the patrol inspection.

In an embodiment, the proof information or the one or more operating environment parameters comprise a time stamp of the patrol inspection.

In another aspect, a system for blockchain-based storage of patrol inspection proof is provided. The system comprises a processor and a non-transitory computer-readable storage medium storing instructions executable by the processor to cause the system to perform operations. The operations include: receiving proof information of patrol inspection at a patrol inspection site; obtaining one or more operating environment parameters of the mobile terminal at a time of the patrol inspection, wherein the one or more operating environment parameters comprise at least location information and sensor data of the mobile terminal; performing credibility verification on the patrol inspection site based on the proof information, the location information, and the sensor data using an algorithm model based on labeled identification information, labeled operating environment parameters, and historical attendance information; and in response to the credibility verification being successful, uploading verification information associated with the proof information for storing in a blockchain.

In yet another aspect, a non-transitory computer-readable storage medium for blockchain-based storage of patrol inspection proof is provided. The medium is configured with instructions executable by one or more processors to cause the one or more processors to perform operations. The operations include: receiving proof information of patrol inspection at a patrol inspection site; obtaining one or more operating environment parameters of the mobile terminal at a time of the patrol inspection, wherein the one or more operating environment parameters comprise at least location information and sensor data of the mobile terminal; performing credibility verification on the patrol inspection site based on the proof information, the location information, and the sensor data using an algorithm model based on labeled identification information, labeled operating environment parameters, and historical attendance information; and in response to the credibility verification being successful, uploading verification information associated with the proof information for storing in a blockchain. The solutions of the embodiments of the specification can achieve the following beneficial effects.

The patrol inspection proof information and the operating environment parameters are stored using a blockchain technology, so that a traceable and tamperproof patrol inspection information record can be conveniently implemented. Once the information record needs to be traced, a cause of an event can be confirmed by a patrol inspection information record stored in a blockchain, and credibility of the traced information record is ensured. In this way, confidence and traceability of a patrol inspection information record of the patrol inspection person can be improved, thereby improving safety of a site and reducing a probability of safety problem occurrence.

BRIEF DESCRIPTION OF THE DRAWINGS

The accompanying drawings described herein are used for providing further understanding for the specification and constitute a part of the specification. Embodiments of the specification and descriptions thereof are used for explaining the specification and do not constitute any limitation to the specification.

DETAILED DESCRIPTION OF THE EMBODIMENTS

To make the objectives, technical solutions, and advantages of the specification clearer, the following clearly and completely describes the technical solutions of the specification with reference to specific embodiments of the specification and the corresponding accompanying drawings. Apparently, the described embodiments are only some embodiments rather than all the embodiments of the specification. All other embodiments obtained by a person of ordinary skill in the art based on the embodiments of the specification without creative efforts shall fall within the protection scope of the specification.

The technical solution provided by various embodiments of the specification will be described in detail below with reference to the accompanying drawings.

The procedure of this embodiment of the specification is as follows. A patrol inspection management person completes a position labelling at a to-be-labeled site using a mobile terminal. A patrol inspection person goes to the labeled positions and checks in, such as records an attendance using a mobile terminal. An inspection person verifies the attendance record of the patrol inspection person.

Figure 1:
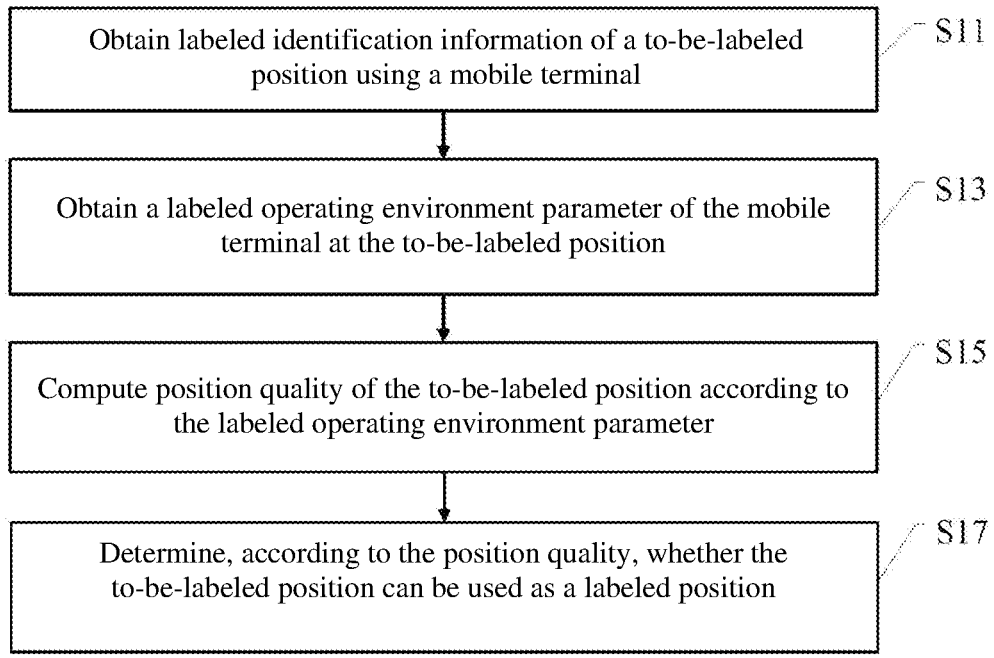
FIG. 1 is a flowchart of a patrol inspection position labelling method, according to an embodiment of the specification.

Before the patrol inspection person performs the patrol inspection and records the attendance, the patrol inspection management person needs to perform a position labelling at a to-be-labeled site using a mobile terminal. FIG. 1 is a flowchart of a patrol inspection position labelling method, according to an embodiment of the specification. The process is as follows.

Step S11: obtain labeled identification information of the to-be-labeled positions using the mobile terminal.

Step S13: obtain labeled operating environment parameters of the mobile terminal at the to-be-labeled positions using the mobile terminal.

Step S15: compute position quality of the to-be-labeled positions according to the labeled operating environment parameters.

Step S17: determine, according to the position quality, whether a to-be-labeled position can be used as a labeled position. If a to-be-labeled position cannot be used as a labeled position, discard the to-be-labeled position. If a to-be-labeled position can be used as a labeled position, store the labeled identification information and the labeled operating environment parameters, and store irreversible verification information of the labeled identification information and the labeled operating environment parameters to a blockchain, to complete the position labelling.

The labeled identification information is identification information set by the patrol inspection management person at the labeled positions. The labeled identification information may include one or more of: a reference marker photo, a reference marker video, two-dimensional barcode information, near-field communication (NFC) information, or the like.

In addition, the mobile terminal used by the patrol inspection management person may be a mobile phone or other devices capable of satisfying a sensed parameter requirement. Using a mobile phone as an example, description is as follows.

An application (APP) or an applet for a position labelling is installed on the mobile phone, the patrol inspection management person logs in to the APP or the applet using a management account, and enters a patrol inspection position labelling page to perform the position labelling.

In this embodiment of the specification, an identifier set for the labeled position may be a landmark, for example, a specific building, plants, or the like, may be a two-dimensional barcode including specific information, or may be an NFC device including specific information, or the like.

When the identifier is a marker, the patrol inspection management person goes to the to-be-labeled position, selects a marker, enters a labelling page using the mobile phone, starts a first camera on the labelling page to image the marker, obtains a reference marker photo, and uses the photo as labelling indication information of the to-be-labeled position. When the photo is taken, a labeled operating environment parameter of the mobile phone at the current to-be-labeled position is collected. The labeled operating environment parameter refers to an operating environment parameter of the mobile terminal at a labeled position, wherein the operating environment parameter includes location-related information, sensor data of the mobile terminal, a focal length of a camera, or a combination thereof.

The location-related information includes Global Positioning System (GPS) positioning information of the mobile terminal, base station information within a first preset distance from the mobile terminal, wireless fidelity (Wi-Fi) information within a second preset distance from the mobile terminal, Bluetooth information within a third preset distance from the mobile terminal, hotspot information within a fourth preset distance from the mobile terminal, or a combination thereof.

The base station information may include identification information of the base station, signal strength of the base station, or a combination thereof. The identification information of the base station may include a name of the base station, an address of the base station, or the like.

The Wi-Fi information may include one or more of Wi-Fi identification information, signal strength, or the like. Similarly, the Wi-Fi identification information may include a Wi-Fi name, a Wi-Fi MAC address, or the like.

The hotspot information may include identification information of a hotspot, signal strength of the hotspot, or a combination thereof. Similarly, the identification information of the hotspot may include a name of the hotspot, an address of the hotspot, or the like.

In addition, the sensor data may include one of the following: temperature information; humidity information; atmospheric pressure information; or sensor data of at least one axis of a multi-axis sensor.

The temperature information may be collected using a temperature sensor or a temperature and humidity sensor. The humidity information may be collected using a humidity sensor or a temperature and humidity sensor. The atmospheric pressure information may be collected using another sensor. The multi-axis sensor may include a 3-axis sensor, a 6-axis sensor, a 9-axis sensor, or the like.

In addition, the first camera may be a rear-facing camera of the mobile phone.

When the identifier is a two-dimensional barcode, the patrol inspection management person goes to a to-be-labeled position, sticks a two-dimensional barcode to the to-be-labeled position, enters a labelling page using the mobile phone, and starts the first camera on the labelling page to scan the two-dimensional barcode and obtain two-dimensional barcode information. When the two-dimensional barcode is scanned using the mobile phone, labeled operating environment parameters of the mobile phone at the current to-be-labeled position is collected, wherein the labeled operating environment parameters are the same as the foregoing parameters. The first camera may be a rear-facing camera of the mobile phone.

When the identifier is an NFC device, the patrol inspection management person goes to a to-be-labeled position, disposes the NFC device at the to-be-labeled position, enters a labelling page using the mobile phone, and starts an NFC module of the mobile phone on the labelling page to connect the mobile phone to the NFC device and obtain NFC information. When the NFC device is connected using the mobile phone, labeled operating environment parameters of the mobile phone at the current to-be-labeled position are collected.

In this embodiment of the specification, the identifier may further be set in other forms, and the identifier may be set to one or more of a marker, a two-dimensional barcode, an NFC device, and the like. The solution in which the identifier is a marker has lower costs, no additional resource consumption, and unlikeliness to change. In the solution having a two-dimensional barcode, a two-dimensional barcode needs to be stuck at each patrol inspection site, and the two-dimensional barcode is likely to be damaged, which may cause that the patrol inspection person fails to record the attendance or add an attendance record. The solution using an NFC device has higher costs and likeliness to be damaged, which may also cause that the patrol inspection person fails to add an attendance record.

Step S15: compute position quality of the to-be-labeled position according to the labeled operating environment parameters.

A higher quality score of the position indicates more accurate location positioning in the subsequent verification of the patrol inspection attendance record. For example, a larger number of Wi-Fi hotspots in the surroundings indicates higher signal strength, more accurate positioning in the subsequent verification of the patrol inspection attendance record, and a higher labelling quality score of the position.

Step S17: determine, according to the position quality, whether the to-be-labeled position can be used as a labeled position. If the to-be-labeled position cannot be used as a labeled position, discard the to-be-labeled position. If the to-be-labeled position can be used as a labeled position, store the labeled identification information and the labeled operating environment parameters, and store irreversible verification information of the labeled identification information and the labeled operating environment parameters to a blockchain, to complete the position labelling.

The computed position quality of the to-be-labeled position is compared with a preset quality threshold. If the position quality of the to-be-labeled position is lower than the preset quality threshold, the to-be-labeled position may not be used as a labeled position, and the to-be-labeled position is discarded. If the position quality of the to-be-labeled position is not lower than the preset quality threshold, the to-be-labeled position may be used as a labeled position, labeled identification information and a collected labeled operating environment parameter of the to-be-labeled position are collected and stored to a cloud in as a file. A hash value of the file is computed, and the hash value is stored to a blockchain, to complete the position labelling.

After the position labelling is completed, the patrol inspection management person may further query and manage on a management page of the mobile phone.

Figure 2:
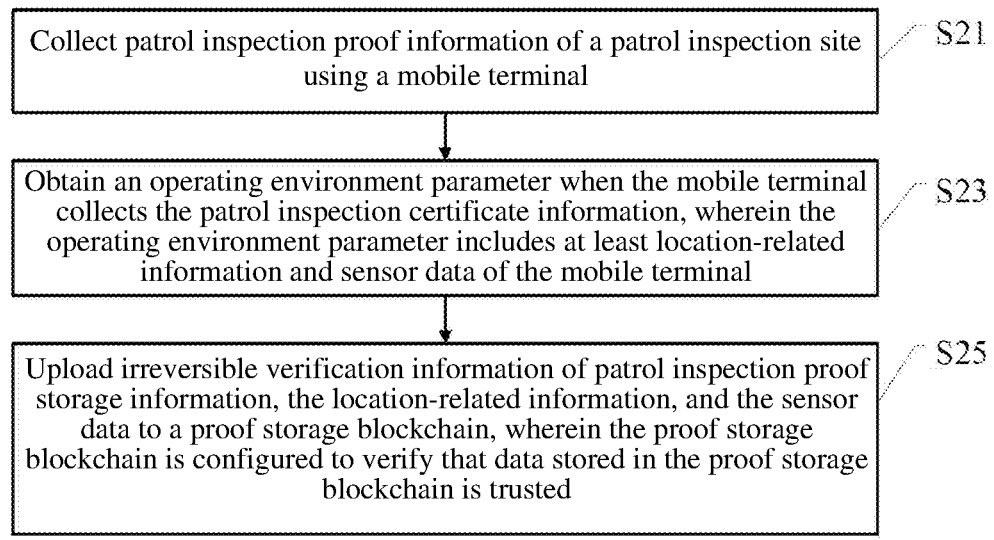
FIG. 2 is a flowchart of a blockchain-based patrol inspection proof storage method, according to an embodiment of the specification.

After the patrol inspection position is labeled, the patrol inspection person may add an attendance record at the position. As shown in FIG. 2, an embodiment of the specification provides a blockchain-based patrol inspection proof storage method, including the following steps.

Step S21: collect proof information of patrol inspection at a patrol inspection site using a mobile terminal.

The patrol inspection proof information refers to identification information obtained by a patrol inspection person at a patrol inspection site, for example, one or more of a visual file having a marker, barcode information, an NFC signal, or the like.

The patrol inspection proof information may be obtained in one or more of the following three manners.

A first manner: a marker at a patrol inspection site is imaged by the mobile terminal, to obtain a visual file of the marker, and the visual file is used as the patrol inspection proof information. The visual file may be a captured video or picture.

A second manner: a barcode of the patrol inspection site is scanned by the mobile terminal, to obtain the patrol inspection proof information carried in the barcode. The barcode may include a one-dimensional barcode or a two-dimensional barcode. The barcode carrying code information may be used as the patrol inspection proof information.

A third manner: A signal sent by an NFC device at the patrol inspection site is received by an NFC module of the mobile terminal, to obtain the patrol inspection proof information carried in the signal.

When the patrol inspection proof information of the patrol inspection site is collected by the mobile terminal, a time stamp may be included, wherein the time stamp is a system time of a mobile terminal when the patrol inspection proof information is obtained during the patron inspection.

Step S23: obtain operating environment parameters when the mobile terminal collects the patrol inspection proof information, wherein the operating environment parameters include at least location-related information and sensor data of the mobile terminal.

When the patrol inspection proof information is obtained, the operating environment parameters of the mobile terminal need to be obtained. When the operating environment parameters are obtained, a current time stamp may also be obtained, wherein the time stamp is a system time of the mobile terminal when the operating environment parameters are obtained during the patron inspection.

By comparing the time stamp of the operating environment parameters with the time stamp of the patrol inspection proof information, whether the operating environment parameters and the patrol inspection proof information are obtained simultaneously can be determined. If the operating environment parameters and the patrol inspection proof information are not obtained simultaneously, it indicates that current attendance record is abnormal.

For the operating environment parameter, the location-related information and the sensor data in this embodiment of the specification may refer to the location-related information and the sensor data in the embodiment shown in FIG. 2. The details are not described again.

Before the uploading irreversible verification information of the patrol inspection proof information, the location-related information and the sensor data to a proof storage blockchain, the method may further include: performing credibility verification on the patrol inspection site and/or the patrol inspection person, and when the credibility verification succeeds, uploading the irreversible verification information of the patrol inspection proof information, the location-related information, and the sensor data to the proof storage blockchain.

After the patrol inspection proof information and the operating environment parameters are obtained, credibility verification may be performed on a current patrol inspection site according to the patrol inspection proof information and the operating environment parameter. In this way, whether the patrol inspection proof information collected by the mobile terminal is actually collected at the patrol inspection site can be verified, to discover a forged patrol inspection proof information scenario.

When the patrol inspection proof information of the patrol inspection site is collected by the mobile terminal, the method may further include collecting biometric recognition information of the patrol inspection person.

The performing credibility verification on the patrol inspection person includes performing credibility verification on the patrol inspection person according to the biometric recognition information.

When the patrol inspection person needs to be verified, the biometric recognition information of the patrol inspection person needs to be obtained when the patrol inspection proof information is obtained, and further, credibility verification is performed on the patrol inspection person according to the biometric recognition information. By performing credibility verification on the patrol inspection person, a real identity of the patrol inspection person can be determined, to verify that the patrol inspection person is a corresponding patrol inspection person at a corresponding patrol inspection site and a patrol inspection time. When there is no requirement on a patrol inspection person and there is a requirement on a patrol inspection site only, a personnel verification function may be disabled. Only the patrol inspection proof information and the operating environment parameters need to be obtained for credibility verification on the patrol inspection site. The biometric recognition information may include one or more of a visual file including a human head portrait, a human facial feature, a human fingerprint feature, and the like. The visual file may be a video or a picture.

The mobile terminal used by the patrol inspection person may be a mobile phone or another device that is capable of satisfying a requirement for collecting a sensed parameter. Using a mobile phone as an example, description is as follows.

When the patrol inspection person arrives at a patrol inspection position, the patrol inspection person enters an attendance record page using an APP or an applet of the mobile phone, selects an attendance record site, and record the attendance. Three manners for obtaining the patrol inspection proof information are described in step S21. A specific manner for obtaining the operating environment parameters and the biometric recognition information include the following several cases.

A first case: the identifier is a marker.

When the biometric recognition information needs to be collected, the following three manners are included.

1) When the mobile terminal receives an attendance recording instruction sent by the patrol inspection person, the mobile terminal starts a first camera and a second camera of the device simultaneously, and the patrol inspection person directs the first camera at the marker to image the marker, and at the same time, directs the second camera at the face of the patrol inspection person to image the face synchronously, to obtain a visual file including the marker and a visual file including a human head portrait.

2) When the mobile terminal receives an attendance recording instruction sent by the patrol inspection person, the mobile terminal starts the first camera and the second camera simultaneously, and the patrol inspection person directs the first camera at the marker to image the marker, and at the same time, directs the second camera at the face of the patrol inspection person to perform face recognition, to obtain a visual file including the marker and a human facial feature.

3) When the mobile terminal receives an attendance recording instruction sent by the patrol inspection person, the mobile terminal starts the first camera and simultaneously starts a fingerprint recognition module on a screen, and the patrol inspection person directs the first camera at the marker to image the marker, and at the same time, verifies a fingerprint on a screen, to obtain a visual file including the marker and a human fingerprint feature.

If the biometric recognition information does not need to be collected, when the mobile terminal receives an attendance recording instruction sent by the patrol inspection person, the mobile terminal starts the first camera only, and the patrol inspection person directs the first camera at the marker to image the marker, to obtain a visual file including the marker.

Regardless of whether the biometric recognition information is collected, the operating environment parameters of the mobile terminal are collected when the first camera is directed at the marker to image the marker.

A second case: the identifier is a two-dimensional barcode.

Similarly, when the biometric recognition information needs to be collected, the following three manners are included.

1) When the mobile terminal receives an attendance recording instruction sent by the patrol inspection person, the mobile terminal starts the first camera and the second camera of the device simultaneously, and the patrol inspection person directs the first camera at the two-dimensional barcode to scan the two-dimensional barcode, and at the same time, directs the second camera at the face of the patrol inspection person to image the face synchronously, to obtain two-dimensional barcode information and a visual file that includes a human head portrait.

2) When the mobile terminal receives an attendance recording instruction sent by the patrol inspection person, the mobile terminal starts the first camera and the second camera simultaneously, and the patrol inspection person directs the first camera at the two-dimensional barcode to scan the two-dimensional barcode, and at the same time, directs the second camera at the face of the patrol inspection person to perform face recognition, to obtain two-dimensional barcode information and a human facial feature.

3) When the mobile terminal receives an attendance recording instruction sent by the patrol inspection person, the mobile terminal starts the first camera and simultaneously starts the fingerprint recognition module on the screen, and the patrol inspection person directs the first camera at the two-dimensional barcode to scan the two-dimensional barcode, and at the same time, verifies a fingerprint on the screen, to obtain two-dimensional barcode information and a human fingerprint feature.

If the biometric recognition information does not need to be collected, when the mobile terminal receives an attendance recording instruction sent by the patrol inspection person, the mobile terminal starts the first camera only, and the patrol inspection person directs the first camera at the two-dimensional barcode to scan the two-dimensional barcode, to obtain two-dimensional barcode information.

Regardless of whether the biometric recognition information is collected, the operating environment parameters of the mobile terminal are collected when the first camera is directed at the two-dimensional barcode to scan the two-dimensional barcode.

A third case: the identifier is an NFC device.

Similarly, when the biometric recognition information needs to be collected, the following three manners are included.

1) When the mobile terminal receives an attendance record recording sent by the patrol inspection person, the mobile terminal starts an NFC module and the second camera of the device simultaneously, and the patrol inspection person obtains, using the NFC module of the mobile terminal, a signal sent by the NFC device, and at the same time, directs the second camera at the face of the patrol inspection person to image the face synchronously, to obtain NFC information and a visual file that includes a human head portrait.

2) When the mobile terminal receives an attendance recording instruction sent by the patrol inspection person, the mobile terminal starts the NFC module and the second camera of the device simultaneously, and the patrol inspection person obtains, using the NFC module of the mobile terminal, a signal sent by the NFC device, and at the same time, directs the second camera at the face of the patrol inspection person to perform face recognition, to obtain NFC information and a human facial feature.

3) When the mobile terminal receives an attendance recording instruction sent by the patrol inspection person, the mobile terminal starts the NFC module and simultaneously starts the fingerprint recognition module on the screen, and the patrol inspection person obtains, using the NFC module of the mobile terminal, a signal sent by the NFC device, and at the same time, verifies a fingerprint on the screen, to obtain NFC information and a human fingerprint feature.

When the biometric recognition information does not need to be collected, when the mobile terminal receives an attendance recording instruction sent by the patrol inspection person, the mobile terminal starts the NFC module only, and the patrol inspection person obtains, using the NFC module of the mobile terminal, a signal sent by the NFC device, to obtain NFC information.

Regardless of whether the biometric recognition information is collected, the operating environment parameters of the mobile terminal are collected when the NFC module of the mobile terminal is used to obtain a signal sent by the NFC device.

In the foregoing three cases, the first camera may be a rear-facing camera, and the second camera may be a front-facing camera. The biometric recognition information may be collected in three manners: fingerprint verification, human imaging, or human face recognition. The three manners may exist independently. The fingerprint verification and the human imaging may coexist, and the fingerprint verification and the human face recognition may also coexist, and may be combined with various manners of collecting the patrol inspection proof information. The above all fall within the protection scope of the specification.

In this embodiment of the specification, when the patrol inspection proof information, the operating environment parameter, and the biometric recognition information are collected, corresponding time stamps are recorded. Whether the patrol inspection proof information, the operating environment parameter, and the biometric recognition information are collected simultaneously may be determined according to the time stamps of the patrol inspection proof information, the operating environment parameter, and the biometric recognition information. In an embodiment, whether the patrol inspection proof information, the operating environment parameter, and the biometric recognition information are collected simultaneously may be comprehensively determined according to the collected patrol inspection proof information, the collected operating environment parameter, and the collected biometric recognition information, for example, may be determined according to features such as a position change of a marker in a photo, a shake direction in the imaging, a movement distance in the imaging, and a focal length of a camera. In this way, a malicious attendance recording may be avoided.

Step S25: upload the irreversible verification information of the patrol inspection proof information, the location-related information, and the sensor data to a blockchain for patrol inspection proof storage, wherein the blockchain for patrol inspection proof storage is configured to verify that data stored in the blockchain can be trusted.

In this embodiment of the specification, the method may further include: obtaining patrol inspection event information, and uploading the patrol inspection event information and the irreversible verification information of the patrol inspection proof information, the location-related information, and the sensor data to the blockchain for patrol inspection proof storage. The patrol inspection event information refers to patrol inspection result information about a patrol inspection performed by the patrol inspection person at a patrol inspection site.

The irreversible verification information is signature information (i.e., a digital signature) after the patrol inspection person signs a digest using a private key, or the irreversible verification information includes a digest and signature information for the patrol inspection person to sign the digest using a private key. The digest refers to the patrol inspection proof information, the location-related information, the sensor data, or the like. The irreversible verification information may be entire irreversible verification information after all pieces of information are arranged in a preset sequence, may be each piece of irreversible verification information after the irreversible verification information is divided into a plurality of pieces, or may be irreversible verification information obtained after a plurality of times of irreversible encryption are performed on all files according to one or more irreversible encryption algorithms.

Storage is performed using a blockchain technology, so that a traceable and tamperproof information record can be ensured. Thus, when a problem occurs, the cause confirmation and liability retroaction processes of the event can be trusted. In this way, quality of a task completed by the patrol inspection person can be improved, thereby improving safety of a site and reducing a probability of safety problem occurrence such as a fire disaster.

After the patrol inspection proof information, the location-related information, and the sensor data are obtained, credibility verification may further be performed on a patrol inspection site according to the patrol inspection proof information, the location-related information, and the sensor data. After the biometric recognition information is obtained, credibility verification may further be performed on a person according to the biometric recognition information.

When credibility verification is performed on the patrol inspection site, credibility verification may be performed on the patrol inspection site using a pre-established algorithm model, pre-stored labeled identification information, labeled operating environment parameters, and historical attendance recording information. The algorithm model is an algorithm model computed and simulated according to the labeled identification information, the labeled operating environment parameters, and the historical attendance recording information using a neural network algorithm. By performing credibility verification on a site, whether the patrol inspection person records an attendance at a specified site may be verified, and further, the patrol inspection person is supervised.

Credibility verification is performed on the patrol inspection person according to the biometric recognition information and the operating environment parameters. When the biometric recognition information is a visual file including a human head portrait, credibility verification is performed on a person using methods such as face recognition, comparative recognition based on environment images, Wi-Fi-based local positioning, synchronous verification based on a picture taken by a front-facing camera and a picture taken by a rear-facing camera, action/motion recognition based on a 9-axis sensor, or three-dimensional recognition in imaging performed based on dual cameras and a focal length.

When the biometric recognition information is a human facial feature, credibility verification is performed on a person according to a pre-stored human facial feature set. When the biometric recognition information is a human fingerprint feature, credibility verification is performed on the person according to a pre-stored human fingerprint set.

When a person does not need to be verified, credibility verification does not need to be performed on the patrol inspection person.

The processes of performing credibility verification on the patrol inspection site and the patrol inspection person in this embodiment of the specification may be implemented by the mobile terminal used by the patrol inspection person or may be implemented by a background server.

After credibility verification is performed on the patrol inspection site and/or the patrol inspection person, the method may further include: when the credibility verification succeeds, recording information that indicates that the patrol inspection person successfully adds an attendance record at the patrol inspection site.

After a computing result of a trusted environment is obtained, whether the attendance record is successfully added may be determined according to the computing result of the trusted environment. When credibility verification is not performed on the person, whether the attendance record is successfully added is determined according to a credibility verification result of the patrol inspection site. When credibility verification is performed on both the patrol inspection site and the person, whether the attendance record is successfully added is determined according to the credibility verification result of the patrol inspection site and a credibility verification result of the patrol inspection person. The verification result may be returned to the mobile device to indicate that the identified proof information is verified.

After the determining is completed, information related to the attendance record may be stored to the blockchain. To save a storage space of the blockchain, if the attendance is successfully recorded, information indicating a successful attendance recording is recorded, stored to and sent back to a user, to complete the attendance recording at this position. If the attendance recording fails, information related to the attendance recording is not stored, and information indicating a failed attendance recording is sent back to the user, to prompt the user to record an attendance again. In this way, the storage space may be saved, and the attendance recording process may be optimized.

Information related to the attendance recording includes the patrol inspection proof information, the location-related information, the sensor data, a computing result of a trusted environment, or the like.

In this embodiment of the specification, before collecting patrol inspection proof information of a patrol inspection site using a mobile terminal in step S21, the method may further include detecting reliability of a system environment of the mobile terminal.

By detecting the reliability of the system environment of the mobile terminal, abnormal attendance recording caused by a system abnormal may be avoided.

In this embodiment of the specification, by obtaining the patrol inspection proof information, the operating environment parameters, and the biometric recognition information, and calculating the trusted environment of the patrol inspection according to the foregoing three types of information, whether a specified patrol inspection person arrives at a specified patrol inspection site and at a specified time can be confirmed. In addition, the patrol inspection proof information, the operating environment parameters and the biometric recognition information are stored using a blockchain technology, so that a traceable and tamperproof patrol inspection information record can be conveniently implemented. Once the information record needs to be traced, the cause of an event can be confirmed using a patrol inspection information record stored in a blockchain, and credibility of the traced information record is ensured. In this way, confidence and traceability of the patrol inspection information record of the patrol inspection person can be improved, thereby improving safety of a site and reducing a probability of safety problem occurrence.

Figure 3:
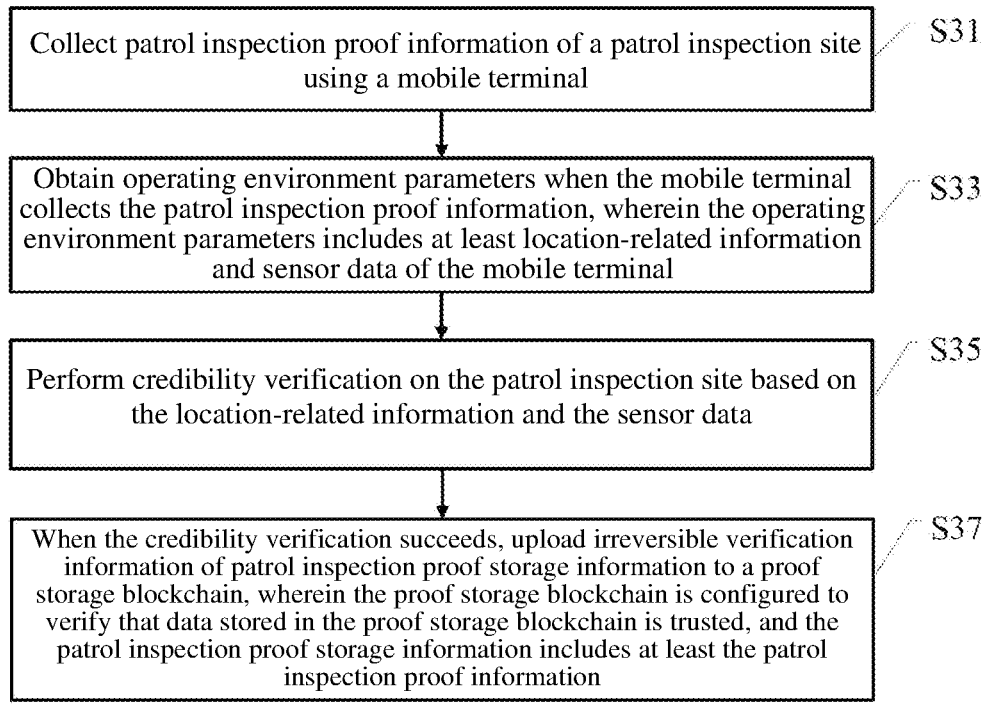
FIG. 3 is a flowchart of a blockchain-based patrol inspection proof storage method, according to another embodiment of the specification.

Another embodiment of the specification further provides a blockchain-based proof storage method. As shown in FIG. 3, in the method, first, patrol inspection proof information of a patrol inspection site is collected using a mobile terminal, and operating environment parameters of the mobile terminal are obtained. Then, credibility of the patrol inspection site is computed according to the operating environment parameters, and when the credibility verification on the site succeeds, the patrol inspection proof information is stored to a blockchain for patrol inspection proof storage. In this way, confidence of the site can be ensured, and the patrol inspection person may only need to verify the patrol inspection proof information, thereby reducing the verification time and saving the storage space.

An embodiment of the specification provides a method for blockchain-based patrol inspection proof storage. As shown in FIG. 3, the method specifically includes the following steps.

Step S31: collect patrol inspection proof information of a patrol inspection site using a mobile terminal.

Step S33: obtain operating environment parameters when the mobile terminal collects the patrol inspection proof information, wherein the operating environment parameters include at least location-related information and sensor data of the mobile terminal.

Step S35: perform credibility verification on the patrol inspection site based on the location-related information and the sensor data.

Step S37: when the credibility verification succeeds, upload irreversible verification information of patrol inspection proof storage information to a blockchain for patrol inspection proof storage, wherein the blockchain is configured to verify that data stored in the blockchain is trusted, and the patrol inspection proof storage information includes at least the patrol inspection proof information.

Since step S31 is similar to step S21, please refer to step S21 for related contents. Since the procedure in step S33 is similar to that in step S23, please refer to step S23 for related contents. Details are not described herein again.

For step S35, after the operating environment parameters are obtained when the mobile terminal collects the patrol inspection proof information, credibility verification is performed on the patrol inspection site according to the operating environment parameters. For the operating environment parameters, the location-related information, and the sensor data, refer to the operating environment parameters and the location-related information in the embodiment shown in FIG. 2. Details are not described again.

A location of the patrol inspection site may be positioned using the location-related information and the sensor data, and credibility verification is performed on the positioned location of the patrol inspection site using the pre-stored location information of the labeled patrol inspection site, and in this way, whether the location is the patrol inspection site can be verified.

In addition, credibility verification may further be performed on the patrol inspection site according to the patrol inspection proof information and the operating environment parameters, whether the patrol inspection location is a labeled patrol inspection site can be determined using the operating environment parameter, and whether the patrol inspection site is a specified patrol inspection site may be verified with reference to the patrol inspection proof information. If the patrol inspection site is the specified patrol inspection site, it indicates that the credibility verification of the site succeeds. If the patrol inspection site is not the specified patrol inspection site, even though it is verified that the patrol inspection location is a labeled patrol inspection site but is not a specified patrol inspection site, it indicates that the credibility verification of the site fails. Only when the patrol inspection location is both a labeled patrol inspection site and a specified patrol inspection site, it indicates that the credibility verification succeeds. For a related part, refer to contents in step S25.

When the credibility verification succeeds, the irreversible verification information of the patrol inspection proof storage information is uploaded to the blockchain, wherein the patrol inspection proof storage information includes at least the patrol inspection proof information, the irreversible verification information refers to a digest of the patrol inspection proof information and signature information for the patrol inspection person to sign the digest using a private key, or the irreversible verification information refers to signature information for the patrol inspection person to sign the digest using a private key.

When the operating environment parameters are collected, biometric recognition information of the patrol inspection person may further be collected. For a specific collection process, please refer contents of step S23. After the verification of the patrol inspection site succeeds, personnel verification may further be performed on the patrol inspection person. For details, refer to contents in step S25. If a patrol inspection plan requires a specified patrol inspection person to perform a patrol inspection at a specified patrol inspection site, the patrol inspection person needs to be verified. After the verification succeeds, irreversible verification information of the patrol inspection proof storage information is uploaded to the blockchain, wherein the patrol inspection proof storage information includes at least the patrol inspection proof information and the biometric recognition information of the patrol inspection person. In this way, credibility verification is performed on both the person and the site.

In an embodiment provided in the specification, after credibility verification is performed on the patrol inspection site and/or the patrol inspection person, the method further includes, when the credibility verification succeeds, recording information that indicates that the patrol inspection person successfully recording an attendance at the patrol inspection site.

In an embodiment provided in the specification, the sensor data includes temperature information, humidity information, atmospheric pressure information, sensor data of at least one axis of a multi-axis sensor, or a combination thereof.

In an embodiment provided in the specification, the operating environment parameters further include a focal length of a camera.

In an embodiment provided in the specification, the collecting patrol inspection proof information of a patrol inspection site using a mobile terminal includes imaging a marker of the patrol inspection site using the mobile terminal, to obtain a visual file of the marker, and using the visual file as the patrol inspection proof information.

In an embodiment provided in the specification, the collecting patrol inspection proof information of a patrol inspection site using a mobile terminal includes scanning a barcode of the patrol inspection site using the mobile terminal, to obtain the patrol inspection proof information carried in the barcode.

In an embodiment provided in the specification, the collecting patrol inspection proof information of a patrol inspection site using a mobile terminal includes receiving, using an NFC module of the mobile terminal, a signal sent by an NFC device at the patrol inspection site, to obtain the patrol inspection proof information included in the signal.

In an embodiment provided in the specification, the patrol inspection proof information carries a time stamp.

In an embodiment provided in the specification, the operating environment parameters further include a time stamp.

In an embodiment provided in the specification, before collecting patrol inspection proof information of a patrol inspection site using a mobile terminal, the method further includes: detecting reliability of a system environment of the mobile terminal; and the collecting patrol inspection proof information of a patrol inspection site using a mobile terminal includes, after passing the reliability detection, collecting the patrol inspection proof information of the patrol inspection site using the mobile terminal.

The method for blockchain-based storage of patrol inspection proof provided in this embodiment is similar to that of the method provided in step S21 to step S25. For the related parts, please refer to contents of step S21 to step S25, which are not described herein again.

Figure 4:
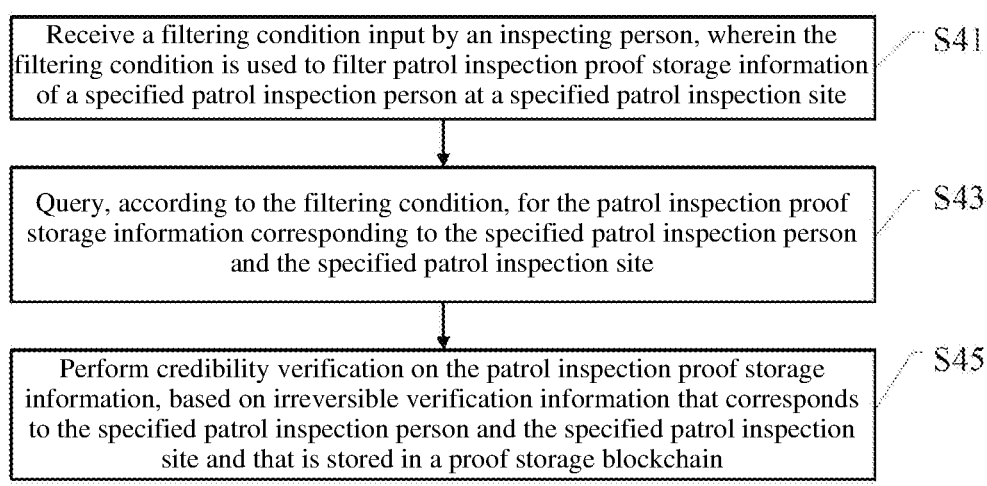
FIG. 4 is a flowchart of a patrol inspection verification method, according to an embodiment of the specification.

An embodiment of the specification further provides a patrol inspection verification method. FIG. 4 is a flowchart of a patrol inspection verification method, according to an embodiment of the specification. The patrol inspection verification method includes the following steps.

Step S41: receive a filtering condition input by an inspecting person, wherein the filtering condition is used to filter patrol inspection proof storage information of a specified patrol inspection person at a specified patrol inspection site.

Step S43: query, according to the filtering condition, for the patrol inspection proof storage information corresponding to the specified patrol inspection person and the specified patrol inspection site.

When inspecting patrol inspection information, an inspecting person uses an inspecting terminal to enter a patrol inspection verification page to verify the patrol inspection information. The inspecting terminal may be a mobile phone or another device that can log in to the patrol inspection verification page.

After logging in to an APP or an applet, the inspecting person enters the verification page, and inputs a filtering condition, for example, a time, a patrol inspection person number, or the like. After receiving a patrol inspection application, the inspecting terminal sends the patrol inspection application to a server and queries for corresponding patrol inspection proof storage information.

Step S45: perform credibility verification on the patrol inspection proof storage information based on irreversible verification information that corresponds to the specified patrol inspection person and the specified patrol inspection site and that is stored in a proof storage blockchain.

The patrol inspection proof storage information refers to information related to attendance recording, including patrol inspection proof information, location-related information, sensor data, a computing result of a trusted environment, or the like.

Before the patrol inspection proof storage information is verified, reliability of the patrol inspection proof storage information needs to be ensured. If the patrol inspection proof storage information has been tampered with, the verification on the patrol inspection proof storage information is meaningless.

After the patrol inspection proof storage information is found through a query, irreversible verification information of the patrol inspection proof storage information is computed, and the irreversible verification information is compared with corresponding irreversible verification information stored on a blockchain. If the two pieces of irreversible verification information are consistent, it indicates that the patrol inspection proof storage information is not tampered with and can be trusted. If the pieces of irreversible verification information are inconsistent, it indicates that the patrol inspection proof storage information may be tampered with and is untrusted. By verifying a hash value of the patrol inspection proof storage information, whether the patrol inspection proof storage information can be trusted is determined.

After credibility verification on the patrol inspection proof storage information is completed, a verification result may further be output to the inspecting person. Using the verification result, the inspecting person may selectively verify the patrol inspection proof storage information, to improve patrol inspection efficiency.

The execution entities of the steps in the method provided in the embodiments may be a same device, or execution entities of the method may be different devices. For example, an execution entity of step 11 and step 12 may be a device 1, an execution entity of step 13 may be a device 2. For another example, an execution entity of step 11 may be the device 1, an execution entity of step 12 and step 13 may be the device 2, and so on.

The foregoing describes an embodiment of the specification, and other embodiments of the specification may fall within a scope of appended claims. In some cases, actions or steps described in the claims may be performed in a sequence different from a sequence in the embodiments and an expected result may be still achieved. In addition, a procedure described in the accompanying drawings may produce a desired result without necessarily using a shown specific sequence or a shown consecutive sequence. In some embodiments, multitasking processing and parallel processing may also be acceptable or may be favorable.

Figure 5:
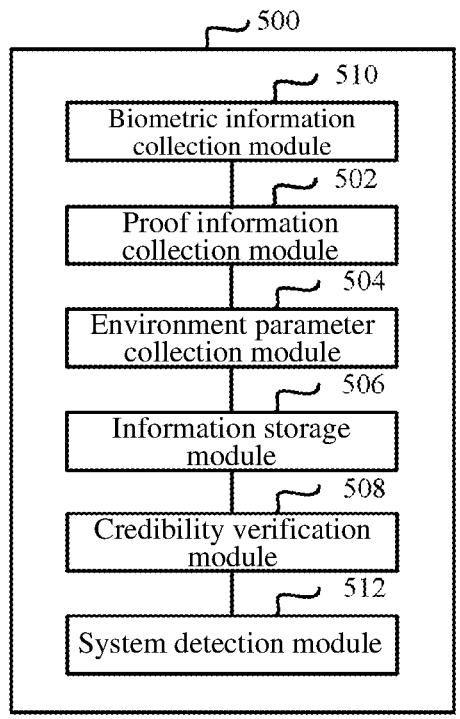
FIG. 5 is a schematic structural diagram of a blockchain-based patrol inspection proof storage apparatus, according to an embodiment of the specification.

FIG. 5 is a schematic structural diagram of a patrol inspection proof storage apparatus, according to an embodiment of the specification. Referring to FIG. 5, a patrol inspection proof storage apparatus 500 may include: a proof information collection module 502, configured to collect patrol inspection proof information of a patrol inspection site using a mobile terminal; an environment parameter collection module 504, configured to obtain operating environment parameters when the patrol inspection proof information is collected, wherein the operating environment parameters include at least location-related information and sensor data of the mobile terminal; and an information storage module 506, configured to upload irreversible verification information of patrol inspection proof storage information to a blockchain, wherein the blockchain is configured to verify that data stored in the blockchain is trusted, and the patrol inspection proof storage information includes the patrol inspection proof information, the location-related information, and/or the sensor data.

In an embodiment, the patrol inspection proof storage apparatus 500 further includes:

a credibility verification module 508, configured to perform credibility verification on the patrol inspection site and/or a patrol inspection person.

The information storage module 506 is specifically configured to, when the credibility verification succeeds, upload the irreversible verification information of the patrol inspection proof storage information to the blockchain.

In an embodiment, the patrol inspection proof storage apparatus 500 further includes:

a biometric information collection module 510, configured to collect biometric recognition information of the patrol inspection person.

The credibility verification module 508 may be configured to perform credibility verification on the patrol inspection person according to the biometric recognition information.

In an embodiment, the credibility verification module 508 may further be configured to perform credibility verification on the patrol inspection site according to the patrol inspection proof information and the operating environment parameters.

In an embodiment, the patrol inspection proof storage apparatus 500 further includes:

a success attendance recording module, configured to, when the credibility verification succeeds, record information that indicates that the patrol inspection person successfully records an attendance at the patrol inspection site.

Specifically, the location-related information includes at least one of the following: global positioning system GPS positioning information of the mobile terminal; base station information within a first preset distance from the mobile terminal; wireless fidelity Wi-Fi information within a second preset distance from the mobile terminal; Bluetooth information within a third preset distance from the mobile terminal; and hotspot information within a fourth preset distance from the mobile terminal.

Specifically, the sensor data includes at least one of the following: temperature information, humidity information, atmospheric pressure information, or sensor data of at least one axis of a multi-axis sensor.

In an embodiment, the operating environment parameters further include: a focal length of a camera.

In an embodiment, the proof information collection module 502 is specifically configured to: image a marker of the patrol inspection site using the mobile terminal, to obtain a visual file of the marker, and use the visual file as the patrol inspection proof information.

In an embodiment, the proof information collection module 502 is specifically configured to: scan a barcode of the patrol inspection site using the mobile terminal, to obtain the patrol inspection proof information includes in the barcode.

In an embodiment, the proof information collection module 502 is specifically configured to: receive, using an NFC module of the mobile terminal, a signal sent by an NFC device at the patrol inspection site, to obtain the patrol inspection proof information carried in the signal.

In an embodiment, the irreversible verification information may include: a digest of the patrol inspection proof storage information, and/or signature information after a patrol inspection person signs the digest using a private key.

In an embodiment, the patrol inspection proof information carries a time stamp.

In an embodiment, the operating environment parameters further include a time stamp.

In an embodiment, the patrol inspection proof storage apparatus 500 further includes: a system detection module 512, configured to detect reliability of a system environment of the mobile terminal.

The proof information collection module 502 is specifically configured to after the reliability passes the detection, collect the patrol inspection proof information of the patrol inspection site using the mobile terminal.

The apparatus provided in this embodiment may be implemented by hardware of a computer, or may be implemented by software. The blockchain-based patrol inspection proof storage apparatus 500 may implement the method in the method embodiment shown in FIG. 2. Reference may be made to the blockchain-based patrol inspection proof storage method shown in FIG. 2 for details, and the details are not described herein again.

Figure 6:
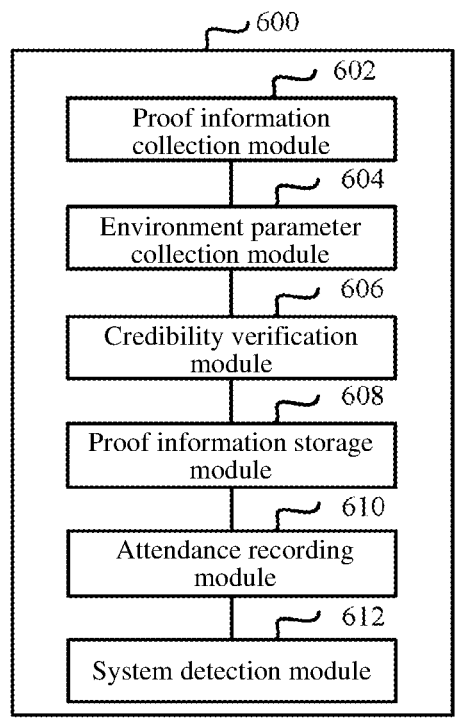
FIG. 6 is a schematic structural diagram of a blockchain-based patrol inspection proof storage apparatus, according to another embodiment of the specification.

FIG. 6 is a schematic structural diagram of a blockchain-based patrol inspection proof storage apparatus, according to another embodiment of the specification. Referring to FIG. 6, a blockchain-based patrol inspection proof storage apparatus 600 includes: a proof information collection module 602, configured to collect patrol inspection proof information of a patrol inspection site; an environment parameter collection module 604, configured to obtain operating environment parameters when the patrol inspection proof information is collected, wherein the operating environment parameters include at least location-related information and sensor data of the mobile terminal; a credibility verification module 606, configured to perform credibility verification on the patrol inspection site based on the location-related information and the sensor data; and a proof information storage module 608, configured to: when the credibility verification succeeds, upload irreversible verification information of patrol inspection proof storage information to a proof storage blockchain, wherein the proof storage blockchain is configured to verify that data stored in the proof storage blockchain is trusted, and the patrol inspection proof storage information includes at least the patrol inspection proof information.

In an embodiment provided in the specification, the patrol inspection proof storage apparatus 600 further includes: an attendance recording module 610, configured to, when the credibility verification succeeds, record information that indicates that the patrol inspection person successfully records an attendance at the patrol inspection site.

In an embodiment provided in the specification, the location-related information includes at least one of the following: global positioning system GPS positioning information of the mobile terminal; base station information within a first preset distance from the mobile terminal; wireless fidelity Wi-Fi information within a second preset distance from the mobile terminal; Bluetooth information within a third preset distance from the mobile terminal; and hotspot information within a fourth preset distance from the mobile terminal.

In an embodiment provided in the specification, the sensor data includes one of the following: temperature information, humidity information, atmospheric pressure information, and sensor data of at least one axis of a multi-axis sensor.

In an embodiment provided in the specification, the operating environment parameters further include: a focal length of a camera.

In an embodiment provided in the specification, the proof information collection module 602 is configured to: image a marker of the patrol inspection site using the mobile terminal, to obtain a visual file of the marker, and use the visual file as the patrol inspection proof information.

In an embodiment provided in the specification, the proof information collection module 602 is configured to: scan a barcode of the patrol inspection site using the mobile terminal, to obtain the patrol inspection proof information carried in the barcode.

In an embodiment provided in the specification, the proof information collection module 602 is configured to: receive, using an NFC module of the mobile terminal, a signal sent by an NFC device at the patrol inspection site, to obtain the patrol inspection proof information carried in the signal.

In an embodiment provided in the specification, the patrol inspection proof information carries a time stamp.

In an embodiment provided in the specification, the operating environment parameters further include a time stamp.

In an embodiment provided in the specification, the patrol inspection proof storage apparatus 600 further includes: a system detection module 612, configured to detect reliability of a system environment of the mobile terminal. The proof information collection module 602 is specifically configured to: after the reliability passes the detection, collect patrol inspection proof information of a patrol inspection site using a mobile terminal;

The apparatus provided in this embodiment may be implemented by hardware of a computer, or may be implemented by software. This is not limited herein. The blockchain-based patrol inspection proof storage apparatus 600 may implement the method in the method embodiment shown in FIG. 3. Reference may be made to the blockchain-based patrol inspection proof storage method shown in FIG. 3 for details, and the details are not described herein again.

Figure 7:
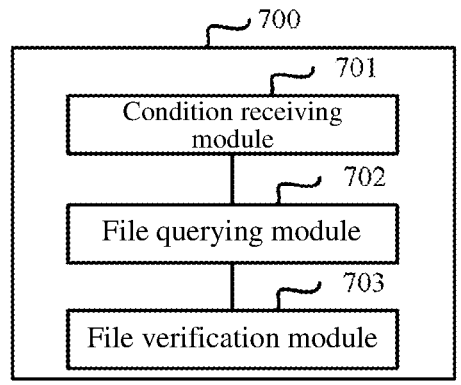
FIG. 7 is a schematic structural diagram of a patrol inspection verification apparatus, according to an embodiment of the specification.

FIG. 7 is a schematic structural diagram of a patrol inspection verification apparatus, according to an embodiment of the specification. Referring to FIG. 7, a patrol inspection verification apparatus 700 may include: a condition receiving module 701, configured to receive a filtering condition input by an inspecting person; a file querying module 702, configured to query for the corresponding patrol inspection proof storage information according to the filtering condition; and a file verification module 703, configured to perform credibility verification on the patrol inspection proof storage information based on irreversible verification information stored in a proof storage blockchain.

The filtering condition includes a time, a patrol inspection person number, and the like.

The apparatus provided in this embodiment may be implemented by hardware of a computer, or may be implemented by software. The patrol inspection verification apparatus 700 may implement the method in the method embodiment shown in FIG. 4. Reference may be made to the patrol inspection verification method shown in FIG. 4, and the details are not described herein again.

Figure 8:
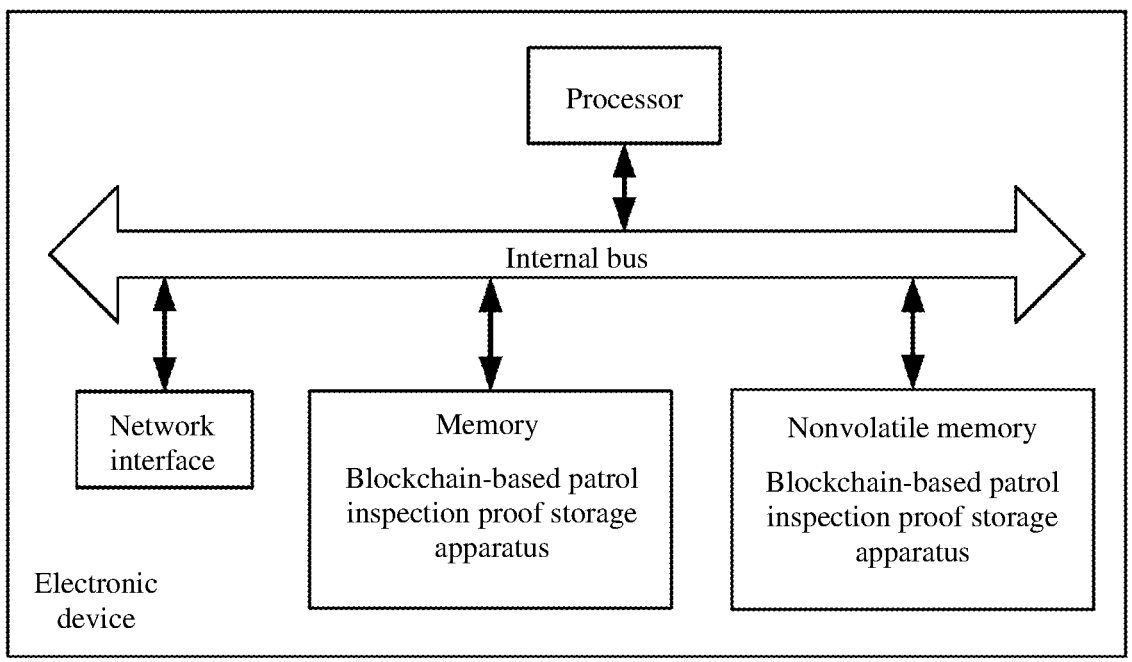
FIG. 8 is a schematic structural diagram of an electronic device, according to an embodiment of the specification.

FIG. 8 is a schematic structural diagram of an electronic device according to an embodiment of the specification. Referring to FIG. 8, at the hardware level, the electronic device includes a processor, and may include an internal bus, a network interface, and a memory. The memory may include a memory, for example, a random access memory (RAM), or may further include a non-volatile memory, for example, at least one magnetic disk memory. Certainly, the electronic device may further include hardware required for other services.

The processor, the network interface, and the memory may be connected to each other through the internal bus. The internal bus may be an industry standard architecture (ISA) bus, a peripheral component interconnect (PCI) bus, or an extended industry standard architecture (EISA) bus. The bus may be classified into an address bus, a data bus, a control bus, and the like. For ease of illustration, in FIG. 8, the bus is represented using only one double-sided arrow. This, however, does not indicate that there is only one bus or only one type of bus.

The memory is configured to store a program. Specifically, the program may include program code, wherein the program code includes a computer operation instruction. The memory may include an internal memory and a non-volatile memory, and provide instructions and data to the processor.

The processor reads a corresponding computer program from the non-volatile memory into the memory and then executes the computer program, to form a blockchain-based patrol inspection proof storage apparatus at the logic level. The processor executes the program stored in the memory and is specifically configured to perform the following operations: collecting patrol inspection proof information of a patrol inspection site; obtaining operating environment parameters when the patrol inspection proof information is collected, wherein the operating environment parameters include at least location-related information and sensor data of the mobile terminal; and uploading irreversible verification information of patrol inspection proof storage information to a proof storage blockchain, wherein the proof storage blockchain is configured to verify that data stored in the proof storage blockchain is trusted, and the patrol inspection proof storage information includes the patrol inspection proof information, the location-related information, and/or the sensor data.

In an embodiment, the processor executes the program stored in the memory and is configured to perform the following operations: collecting patrol inspection proof information of a patrol inspection site using a mobile terminal; obtaining operating environment parameters when the mobile terminal collects the patrol inspection proof information, wherein the operating environment parameters include at least location-related information and sensor data of the mobile terminal; performing credibility verification on the patrol inspection site based on the location-related information and the sensor data; and when the credibility verification succeeds, uploading irreversible verification information of patrol inspection proof storage information to a proof storage blockchain, wherein the proof storage blockchain is configured to verify that data stored in the proof storage blockchain is trusted, and the patrol inspection proof storage information includes at least the patrol inspection proof information.

The foregoing blockchain-based patrol inspection proof storage apparatus disclosed in the embodiments shown in FIG. 2 or FIG. 3 of the specification may be applied to a processor or implemented by a processor. The processor may be an integrated circuit chip and has a signal processing capability. In an embodiment, steps of the foregoing method may be implemented using a hardware integrated logic circuit in the processor or instructions in a form of software. The processor may be a general processor, including a central processing unit (CPU), a network processor (NP), and the like; or may further be a digital signal processor (DSP), an application-specific integrated circuit (ASIC), a field programmable gate array (FPGA), or another programmable logical device, discrete gate or transistor logical device, or discrete hardware component. It may implement or perform the methods, the steps, and logical block diagrams that are disclosed in the embodiments of the specification. The general-purpose processor may be a microprocessor, or the processor may be any conventional processor or the like. Steps of the methods disclosed with reference to the embodiments of the specification may be directly performed and completed using a hardware decoding processor, or may be performed and completed using a combination of hardware and a software module in the decoding processor. The software module may be located in a mature storage medium in the art, such as a RAM, a flash memory, a ROM, a programmable ROM, an electrically erasable programmable memory, or a register. The storage medium is located in the memory, and the processor reads information in the memory and completes the steps in the foregoing methods in combination with hardware of the processor.

The electronic device may further perform the method in FIG. 2 or FIG. 3, and implement functions of the patrol inspection proof storage apparatus in the embodiment shown in FIG. 2 or FIG. 3, which is not described in the embodiment of the specification again.

Figure 9:
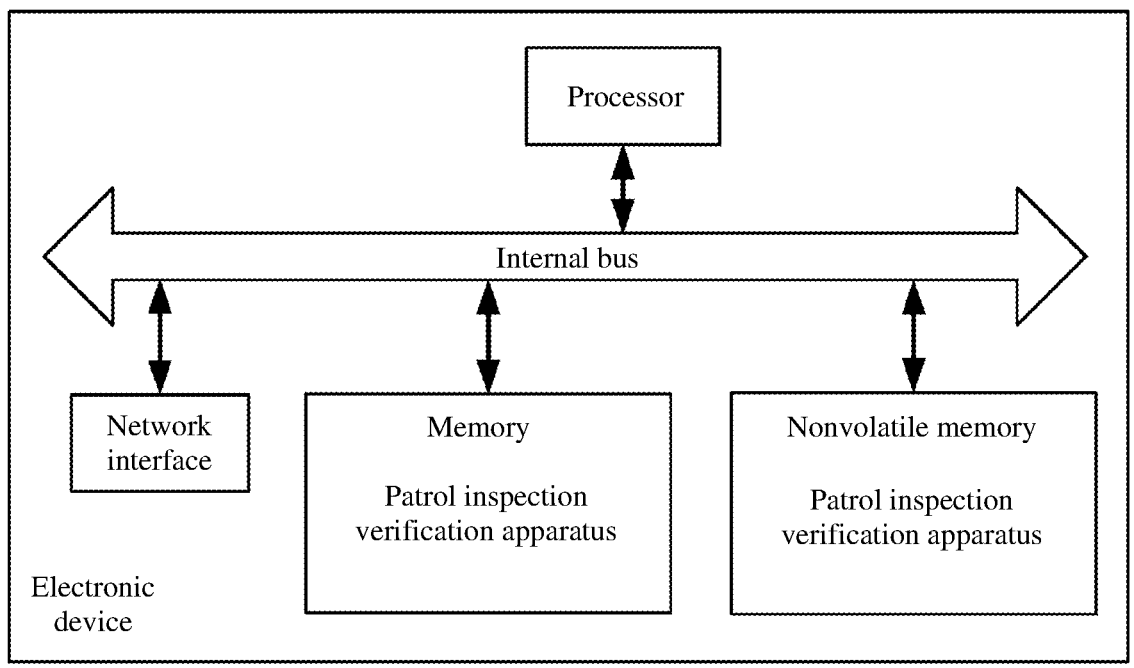
FIG. 9 is a schematic structural diagram of another electronic device, according to an embodiment of the specification.

FIG. 9 is a schematic structural diagram of an electronic device according to an embodiment of the specification. Referring to FIG. 9, at the hardware level, the electronic device includes a processor, and In an embodiment, includes an internal bus, a network interface, and a memory. The memory may include a memory, for example, a random access memory (RAM), or may further include a non-volatile memory, for example, at least one magnetic disk memory. Certainly, the electronic device may further include hardware required for other services.

The processor, the network interface, and the memory may be connected to each other through the internal bus. The internal bus may be an industry standard architecture (ISA) bus, a peripheral component interconnect (PCI) bus, or an extended industry standard architecture (EISA) bus. The bus may be classified into an address bus, a data bus, a control bus, and the like. For ease of illustration, in FIG. 9, the bus is represented using only one double-sided arrow. This, however, does not indicate that there is only one bus or only one type of bus.

The memory is configured to store a program. Specifically, the program may include program code, wherein the program code includes a computer operation instruction. The memory may include an internal memory and a non-volatile memory, and provide instructions and data to the processor.

The processor reads a corresponding computer program from the non-volatile memory into the memory and then executes the computer program, to form a blockchain-based patrol inspection verification apparatus at the logic level. The processor executes the program stored in the memory and is specifically configured to perform the following operations: receiving a filtering condition input by an inspecting person, wherein the filtering condition is used to filter patrol inspection proof storage information of a specified patrol inspection person at a specified patrol inspection site; querying, according to the filtering condition, for the patrol inspection proof storage information corresponding to the specified patrol inspection person and the specified patrol inspection site; and performing credibility verification on the patrol inspection proof storage information based on irreversible verification information that corresponds to the specified patrol inspection person and the specified patrol inspection site and that is stored in a proof storage blockchain.

The foregoing blockchain-based patrol inspection verification apparatus disclosed in the embodiment shown in FIG. 4 of the specification may be applied to a processor or implemented by a processor. The processor may be an integrated circuit chip and has a signal processing capability. In an embodiment, steps of the foregoing method may be implemented using a hardware integrated logic circuit in the processor or instructions in a form of software. The processor may be a general processor, including a central processing unit (CPU), a network processor (NP), and the like; or may further be a digital signal processor (DSP), an application-specific integrated circuit (ASIC), a field programmable gate array (FPGA), or another programmable logical device, discrete gate or transistor logical device, or discrete hardware component. It may implement or perform the methods, the steps, and logical block diagrams that are disclosed in the embodiments of the specification. The general-purpose processor may be a microprocessor, or the processor may be any conventional processor or the like. Steps of the methods disclosed with reference to the embodiments of the specification may be directly performed and completed using a hardware decoding processor, or may be performed and completed using a combination of hardware and a software module in the decoding processor. The software module may be located in a mature storage medium in the art, such as a RAM, a flash memory, a ROM, a programmable ROM, an electrically erasable programmable memory, or a register. The storage medium is located in the memory, and the processor reads information in the memory and completes the steps in the foregoing methods in combination with hardware of the processor.

The electronic device may further perform the method in FIG. 4, and implement functions of the patrol inspection verification apparatus in the embodiment shown in FIG. 4, which is not described in the embodiment of the specification again.

Definitely, in addition to a software implementation, the electronic device in the specification does not exclude other implementations, for example, a logic device or a combination of software and hardware. In other words, an entity executing the following processing procedure is not limited to the logic units, and may also be hardware or logic devices.

Embodiments of the specification are described above. Other embodiments fall within the scope of the appended claims. In some embodiments, the actions or steps recorded in the claims may be performed in sequences different from those in the embodiments and an expected result may still be achieved. In addition, the processes depicted in the accompanying drawings do not necessarily require specific sequences or consecutive sequences to achieve an expected result. In some implementations, multitasking and parallel processing may be feasible or beneficial.

The foregoing descriptions are merely embodiments of the specification and are not intended to limit the protection scope of the specification. Any modification, equivalent replacement, or improvement made within the spirit and principle of one or more embodiments of the specification shall fall within the protection scope of one or more embodiments of the specification.

The system, the apparatus, the module or the unit described in the foregoing embodiments can be specifically implemented by a computer chip or an entity or implemented by a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

When the functions disclosed herein are implemented in the form of software functional units and sold or used as independent products, they can be stored in a processor executable non-volatile computer readable storage medium. Particular technical solutions disclosed herein (in whole or in part) or aspects that contributes to current technologies may be embodied in the form of a software product. The software product may be stored in a storage medium, comprising a number of instructions to cause a computing device (which may be a personal computer, a server, a network device, and the like) to execute all or some steps of the methods of the embodiments. The storage medium may comprise a flash drive, a portable hard drive, ROM, RAM, a magnetic disk, an optical disc, another medium operable to store program code, or any combination thereof.

The computer readable medium includes a persistent medium and a non-persistent medium, a removable medium and a non-removable medium, which may implement storage of information using any method or technology. The information may be a computer readable instruction, a data structure, a module of a program or other data. Examples of computer storage media include but are not limited to a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, tape and disk storage or other magnetic storage device or any other non-transmission media that may be configured to store information that a computing device can access. Based on the definition in the specification, the computer-readable medium does not include transitory computer readable media (transitory media), such as a modulated data signal and a carrier.

It should also be noted that the terms "include", "comprise" and any other variants mean to cover the non-exclusive inclusion. Thereby, the process, method, article, or device which include a series of elements not only include those elements, but also include other elements which are not clearly listed, or include the inherent elements of the process, method, article and device. Without further limitation, the element defined by a phrase "include one" does not exclude other same elements in the process, method, article or device which include the element.

The embodiments in the specification are all described in a progressive manner, for same or similar parts in the embodiments, refer to these embodiments, and descriptions of each embodiment focus on a difference from other embodiments. Especially, a system embodiment is basically similar to a method embodiment, and therefore is described briefly; for related parts, reference may be made to partial descriptions in the method embodiment.

What is claimed is:

1. A computer-implemented method for blockchain-based storage of patrol inspection proof, comprising:
   receiving, by a mobile terminal, an attendance recording instruction to record attendance of a patrol inspection;
   synchronously obtaining, by the mobile terminal, (1) biometric recognition information of a patrol inspection person conducting a patrol inspection, (2) proof information of a labeled position at a patrol inspection site, and (3) one or more operating environment parameters of the mobile terminal at a time of the patrol inspection, wherein the one or more operating environment parameters comprises sensor data of the mobile terminal;
   receiving, by a server from the mobile terminal, the obtained proof information, the obtained biometric recognition information, and the obtained one or more operating environment parameters;
   performing, by the server, credibility verification on the patrol inspection by:
      verifying the proof information and the one or more operating environment parameters using an algorithm model based on labeled identification information, labeled operating environment parameters, and historical attendance information stored in a blockchain;
      verifying the biometric recognition information according to pre-stored biometric recognition information and the one or more operating environment parameters; and
      verifying that the biometric recognition information is obtained by the mobile terminal synchronously with the proof information; and
   in response to the credibility verification being successful, uploading, by the server, verification information associated with the proof information, the biometric recognition information, and the one or more operating environment parameters for storing in the blockchain.

2. The method of claim 1, further comprising:
   receiving, from a client terminal, one or more filtering conditions associated with the patrol inspection site;
   querying to identify the proof information of the patrol inspection at the patrol inspection site;

verifying the identified proof information based on the verification information stored in the blockchain;

returning, to the client terminal, a verification result indicating that the identified proof information is verified.

3. The method of claim 1, wherein:

the one or more operating environment parameters comprises location information.

4. The method of claim 3, wherein the location information comprises:

global positioning system (GPS) positioning information of the mobile terminal;

base station information within a first preset distance from the mobile terminal;

wireless fidelity (Wi-Fi) information within a second preset distance from the mobile terminal;

Bluetooth information within a third preset distance from the mobile terminal; or hotspot information within a fourth preset distance from the mobile terminal.

5. The method of claim 1, wherein the sensor data comprises: temperature information, humidity information, atmospheric pressure information, or sensor data of at least one axis of a multi-axis sensor.

6. The method of claim 1, wherein the one or more operating environment parameters further comprise: a focal length of a camera.

7. The method of claim 1, wherein the proof information comprises:

a visual file of a marker of the patrol inspection site captured using the mobile terminal.

8. The method of claim 1, wherein the proof information comprises:

information obtained by scanning a barcode of the patrol inspection site using the mobile terminal.

9. The method of claim 1, wherein the proof information comprises:

information in a signal received by an NFC module of the mobile terminal from an NFC device at the patrol inspection site.

10. The method of claim 1, wherein the verification information comprises:

a digest of the proof information and the one or more operating environment parameters; or a digital signature on the digest based on a private key of the patrol inspection person.

11. The method of claim 1, wherein the proof information or the one or more operating environment parameters comprise a time stamp of the patrol inspection.

12. A system for blockchain-based storage of patrol inspection proof, comprising a processor and a non-transitory computer-readable storage medium storing instructions executable by the processor to cause the system to perform operations comprising:

receiving an attendance recording instruction to record attendance of a patrol inspection;

synchronously obtaining (1) biometric recognition information of a patrol inspection person conducting a patrol inspection, (2) proof information of a labeled position at a patrol inspection site, and (3) one or more operating environment parameters of a mobile terminal at a time of the patrol inspection, wherein the one or more operating environment parameters comprises sensor data of the mobile terminal;

receiving, from the mobile terminal, the obtained proof information, the obtained biometric recognition information, and the obtained one or more operating environment parameters;

performing credibility verification on the patrol inspection by:

verifying the proof information and the one or more operating environment parameters using an algorithm model based on labeled identification information, labeled operating environment parameters, and historical attendance information stored in a blockchain;

verifying the biometric recognition information according to pre-stored biometric recognition information and the one or more operating environment parameters; and verifying that the biometric recognition information is obtained by the mobile terminal synchronously with the proof information; and in response to the credibility verification being successful, uploading verification information associated with the proof information, the biometric recognition information, and the one or more operating environment parameters for storing in the blockchain.

13. The system of claim 12, wherein the operations further comprise:

receiving one or more filtering conditions associated with the patrol inspection site;

querying to identify the proof information of the patrol inspection at the patrol inspection site;

verifying the identified proof information based on the verification information stored in the blockchain;

returning a verification result indicating that the identified proof information is verified.

14. The system of claim 12, wherein:

the one or more operating environment parameters comprises location information.

15. The system of claim 12, wherein the proof information comprises:

a visual file of a marker of the patrol inspection site captured using the mobile terminal.

16. The system of claim 12, wherein the proof information comprises:

information obtained by scanning a barcode of the patrol inspection site using the mobile terminal.

17. The system of claim 12, wherein the proof information comprises:

information in a signal received by an NFC module of the mobile terminal from an NFC device at the patrol inspection site.

18. The system of claim 12, wherein the verification information comprises:

a digest of the proof information and the one or more operating environment parameters; or a digital signature on the digest based on a private key of the patrol inspection person.

19. The system of claim 12, wherein the proof information or the one or more operating environment parameters comprise a time stamp of the patrol inspection.

20. A non-transitory computer-readable storage medium for blockchain-based storage of patrol inspection proof, configured with instructions executable by one or more processors to cause the one or more processors to perform operations comprising:

receiving an attendance recording instruction to record attendance of a patrol inspection;

synchronously obtaining (1) biometric recognition information of a patrol inspection person conducting a patrol inspection, (2) proof information of a labeled position at a patrol inspection site, and (3) one or more operating environment parameters of a mobile terminal at a time of the patrol inspection, wherein the one or more operating environment parameters comprises sensor data of the mobile terminal;

receiving, from the mobile terminal, the obtained proof information, the obtained biometric recognition information, and the obtained one or more operating environment parameters;

performing credibility verification on the patrol inspection by:
  verifying the proof information and the one or more operating environment parameters using an algorithm model based on labeled identification information, labeled operating environment parameters, and historical attendance information stored in a blockchain;
  verifying the biometric recognition information according to pre-stored biometric recognition information and the one or more operating environment parameters; and
  verifying that the biometric recognition information is obtained by the mobile terminal synchronously with the proof information; and in response to the credibility verification being successful, uploading verification information associated with the proof information, the biometric recognition information, and the one or more operating environment parameters for storing in the blockchain.

* * * * *